United States Patent
Gath et al.

(10) Patent No.: US 10,811,693 B2
(45) Date of Patent: *Oct. 20, 2020

(54) FUEL CELL OXIDATION REDUCTION REACTION CATALYST

(71) Applicant: FORD GLOBAL TECHNOLOGIES, LLC, Dearborn, MI (US)

(72) Inventors: Kerrie K. Gath, Pittsfield, MI (US); Jun Yang, Bloomfield Hills, MI (US); Chunchuan Xu, Troy, MI (US); Patrick Pietrasz, Vancouver (CA); Richard E. Soltis, Saline, MI (US); Mark John Jagner, Ypsilanti, MI (US); James Waldecker, Plymouth, MI (US); Zijie Lu, Novi, MI (US); Mark S. Sulek, Sterling Heights, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 784 days.

This patent is subject to a terminal disclaimer.

(21) Appl. No.: 15/248,270

(22) Filed: Aug. 26, 2016

(65) Prior Publication Data

US 2018/0062181 A1    Mar. 1, 2018

(51) Int. Cl.
*H01M 4/92* (2006.01)
*H01M 4/88* (2006.01)
*H01M 8/1018* (2016.01)

(52) U.S. Cl.
CPC ......... *H01M 4/926* (2013.01); *H01M 4/8817* (2013.01); *H01M 4/8871* (2013.01); *H01M 4/8878* (2013.01); *H01M 4/921* (2013.01); *H01M 2008/1095* (2013.01)

(58) Field of Classification Search
CPC .. H01M 4/926; H01M 4/8871; H01M 4/8817; H01M 4/8878; H01M 2008/1095; H01M 4/921

See application file for complete search history.

(56) References Cited

U.S. PATENT DOCUMENTS

| | | | |
|---|---|---|---|
| 7,790,647 B2 | 9/2010 | Okumura et al. | |
| 9,099,751 B2 | 8/2015 | Hays et al. | |
| 2007/0037041 A1* | 2/2007 | Cai | C01G 23/047 429/524 |

(Continued)

OTHER PUBLICATIONS

Zhang, Li, et al. "Highly corrosion resistant platinum-niobium oxide-carbon nanotube electrodes for the oxygen reduction in PEM fuel cells." Energy & Environmental Science 5.3 (2012): 6156-6172. (Year: 2012).*

(Continued)

*Primary Examiner* — Milton I Cano
*Assistant Examiner* — Philip A. Stuckey
(74) *Attorney, Agent, or Firm* — David Kelley; Brooks Kushman P.C.

(57) ABSTRACT

A fuel cell oxidation reduction reaction catalyst comprising a carbon substrate, an amorphous metal oxide intermediate layer on the substrate, and an intertwined matrix of platinum and elemental niobium arranged to form a surface metal layer covering the intermediate layer such that upon oxidation, the niobium binds with oxygen resulting in strengthened bonds between the platinum and the intermediate layer.

18 Claims, 4 Drawing Sheets

(56) References Cited

U.S. PATENT DOCUMENTS

| | | | |
|---|---|---|---|
| 2013/0164655 A1* | 6/2013 | Kremliakova | H01M 4/925 |
| | | | 429/524 |
| 2014/0193746 A1 | 7/2014 | Cerri et al. | |
| 2015/0093685 A1 | 4/2015 | Yang et al. | |
| 2015/0375208 A1 | 12/2015 | Yang et al. | |

OTHER PUBLICATIONS

Sasaki, K., L. Zhang, and R. R. Adzic. "Niobium oxide-supported platinum ultra-low amount electrocatalysts for oxygen reduction." Physical Chemistry Chemical Physics 10.1 (2008): 159-167. (Year: 2007).*

Kong, Lingping, et al. "Nanoarchitectured Nb 2 O 5 hollow, Nb 2 O 5@ carbon and NbO 2@ carbon core-shell microspheres for ultrahigh-rate intercalation pseudocapacitors." Scientific reports 6 (2016): 21177. (Year: 2016).*

* cited by examiner

FUEL CELL OXIDATION REDUCTION REACTION CATALYST

TECHNICAL FIELD

The disclosure relates to a fuel cell oxidation reduction reaction (ORR) cathode catalyst and a method of producing the same.

BACKGROUND

Fuel cells, such as proton exchange membrane fuel cells (PEMFC), represent an attractive source of electricity due to zero-emissions generation and increased energy security. Among the primary components of each fuel cell are two electrodes and an ion conducting electrolyte. The design of the electrodes requires delicate optimization of materials and production processes to ensure good conductance of gas, electrons, and protons such that the resultant electrode is efficient, not prone to flooding, and does not overly deteriorate during use. To improve its catalytic function, it is desirable to include an ORR catalyst onto the cathode. To deposit the catalyst, various solution-based methods including chemical vapor deposition have been developed.

SUMMARY

In at least one embodiment, a fuel cell oxidation reduction reaction catalyst is disclosed. The catalyst may include a carbon powder substrate. The catalyst may further include an amorphous metal oxide intermediate layer on the substrate. The catalyst may additionally include an intertwined matrix of platinum and elemental niobium. The matrix may be arranged to form a surface metal layer covering the intermediate layer such that upon oxidation, the niobium binds with oxygen resulting in strengthened bonds between the platinum and the intermediate layer. The intermediate layer may include niobium oxide, tantalum oxide, molybdenum oxide, or a combination thereof. The platinum loading associated with the surface metal layer may be about 3 wt. % to 50 wt. %. The platinum to niobium ratio may be from 7:1 to 1:7. The intertwined matrix may include at least one layer of platinum and at least one layer of elemental niobium. The intertwined matrix may include a plurality of platinum layers alternating with a plurality of elemental niobium layers. The end of life mass activity of the catalyst after 25,000 cycles may be about 250 $A/g_{Pt}$ to 500 $A/g_{Pt}$ at a Pt loading of about 8 wt. % to 10 wt. %. The mass activity retention of the catalyst may be about 75% to 100% after 25,000 cycles.

In an alternative embodiment, a fuel cell oxidation reduction reaction catalyst is disclosed. The catalyst may include a carbon substrate layer. The catalyst may additionally include an intertwined matrix of platinum and elemental niobium. The matrix may be arranged to form a surface metal layer covering the carbon substrate layer such that upon oxidation, the niobium binds with oxygen resulting in strengthened bonds between the platinum and the carbon substrate layer. The platinum loading associated with the surface metal layer may be about 3 wt. % to 50 wt. %. The platinum to niobium ratio may be from 7:1 to 1:7. The intertwined matrix may include at least one layer of platinum and at least one layer of elemental niobium. The matrix may include a plurality of platinum layers and a plurality of elemental niobium layers arranged in an alternating manner. The end of life mass activity of the catalyst after 25,000 cycles may be about 250 $A/g_{Pt}$ to 500 $A/g_{Pt}$ at a Pt loading of about 5 wt. % to 25 wt. %.

In a yet alternative embodiment, a method of forming a fuel cell oxidation reduction reaction electrocatalyst is disclosed. The method may include depositing a conductive metal oxide on a carbon substrate to form an intermediate layer. The method may further include sputtering elemental platinum and elemental niobium onto the intermediate layer to form a surface metal layer configured as an intertwined matrix. The method may also include transforming at least a portion of the elemental niobium to NbOx by oxidation resulting in strengthened bonds between the platinum and the intermediate layer. The method may further include sputtering elemental platinum and elemental niobium consequentially to form discreet layers of each. The method may include sputtering the elemental platinum and the elemental niobium in a ratio of from 7:1 to 1:7. The intermediate layer may include niobium oxide, tantalum oxide, molybdenum oxide, or a combination thereof. The method may also include achieving mass activity retention of the electrocatalyst of about 80% to 100% after 25,000 cycles. The conductive metal oxide may include an amorphous layer free of a regularly repeating atomic lattice.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except where expressly indicated, all numerical quantities in this description indicating dimensions or material properties are to be understood as modified by the word "about" in describing the broadest scope of the present disclosure.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

The description of a group or class of materials as suitable for a given purpose in connection with one or more embodiments of the present invention implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Fuel cells are devices converting chemical potential energy from a fuel, usually hydrogen, into electrical energy through a chemical reaction of the fuel with oxygen or another oxidizing agent. Fuel cells are capable of producing electricity as long as they have a continuous source of the fuel and oxygen. Many different types of fuel cells have been developed and are being utilized to power a plethora of different vehicles. Exemplary types of fuel cells include PEMFCs, phosphoric acid fuel cells (PAFCs), alkaline fuel cells (AFCs), solid oxide fuel cells (SOFCs), direct methanol fuel cells (DMFCs), molten carbonate fuel cells (MCFCs), etc.

Figure 1:
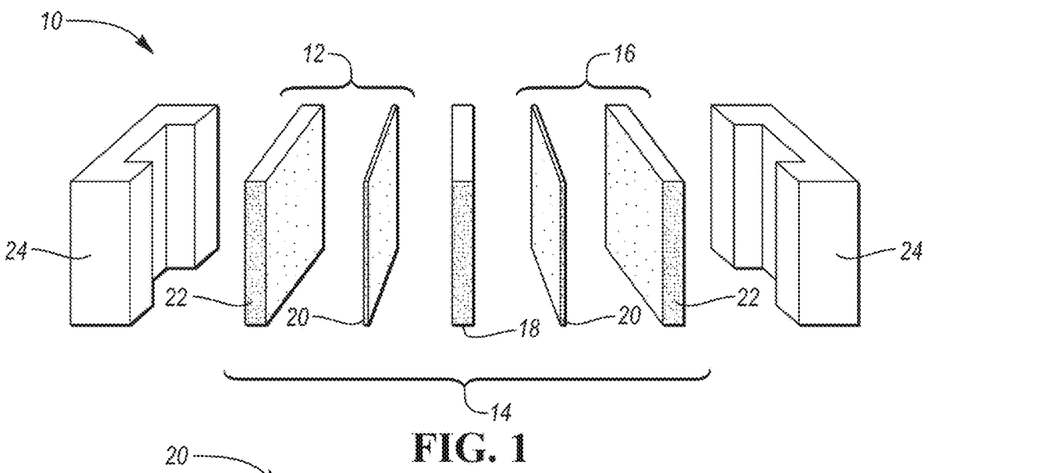
FIG. 1 depicts an exploded schematic view of an example fuel cell unit according to one or more embodiments.

Every fuel cell includes one or more stacks of individual units 10 having several components which are adjacent to each other. An example PEM unit 10 is depicted in FIG. 1 and includes an anode 12, a membrane electrode assembly (MEA) 14, and a cathode 16. An electrolyte is present, carrying electrically charged particles between the two electrodes 12, 16. Typically, MEA 14 includes a PEM 18, two catalyst layers 20, and two gas diffusion layers (GDL) 22. The fuel cell unit 10 further includes an end or bipolar half-plate 24 on each side.

As a pressurized fuel enters the fuel cell on the anode side 12, the fuel undergoes dissociation resulting in positively charged hydrogen ions and electrons. The positively charged hydrogen ions travel through the electrolyte while the electrons travel from the anode 12 to the cathode 16 via an external circuit, producing direct current electricity. If alternating current is needed, the direct current output may be routed through an inverter. Oxygen enters the cathode 16, combining with electrons returning from the electrical circuit and the hydrogen ions to produce water. Alternatively, depending on the type of electrolyte used, the oxygen combined with the electrons may travel through the electrolyte and combine with hydrogen ions at the anode 12.

The anode 12 and the cathode 16 each include a catalyst layer 20 facilitating the reactions of oxygen and hydrogen. At the anode 12 of a PEMFC, a catalyst oxidizes the fuel into the hydrogen protons and electrons. The cathode catalyst catalyzes oxygen reduction reaction (ORR) which results in formation of water. The chemical reactions at the cathode 16 have a more complicated reaction mechanism than the reactions at the anode 12. As a result, the reactions at the cathode 16 are slow and require a substantial amount of catalyst to increase the speed of the reaction. A desirable catalyst must be sufficiently chemically active to be able to activate $O_2$, yet stable enough to withstand the corrosive environment at the cathode 16. Further still, the catalyst layer must be capable of facilitating release of product water from the catalyst surface to free up catalytic sites once the reaction is complete. Additionally, the catalyst must be selective enough to produce the desired product while minimizing production of undesirable intermediates. Thus, typically, the cathode 16 requires a higher catalyst loading than the anode 12.

If a noble metal such as platinum is used as a catalyst, the effective amount required may be ten times higher at the cathode 16 than at the anode 12. Using platinum offers several advantages. For example, platinum is one of the few elements capable of withstanding the acidic (PH<2) operation environment of the fuel cell (VFCOE). On the cathode 16, platinum has the highest activity of all bulk metals. On the anode side, platinum oxidizes hydrogen gas faster at any given potential than other catalyst materials.

Yet, a drawback of the state-of-the-art wet-chemically processed dispersed platinum catalyst nanoparticles on carbon support are the agglomeration of platinum nanoparticles in the VFCOE as well as carbon corrosion under voltage cycling between about 0.05 V to 1.5V stress, which results in a limited life of the fuel cell. Platinum with a secondary metal alloyed ORR catalyst may reduce the usage of scarce platinum metal while at the same time improving performance as compared with that of pure platinum on mass activity, which has led to the development of active and durable platinum-based electrocatalysts with a wide range of compositions.

Additionally, platinum binds oxygen too strongly, which implies that its d-band center is too high. Alloying platinum with non-precious metals lowers the d-band center by both altering the electronics and inducing a degree of irregularity in the platinum lattice, which in turn causes the resulting alloy to bind oxygen more weakly than platinum. Thus, alloying provides a means of tweaking the surface electronic structure such that the overpotential of the ORR catalyst can be minimized.

But identification of a suitable combination of platinum and an alloying element has proven to be challenging as most transition metals are leached out or oxidized and then leached out into the VFCOE. Thus, it would be desirable to identify a specific metal combinable with platinum in a specific ratio which would provide for a stable, highly active, and durable electrocatalyst.

Figure 2A:
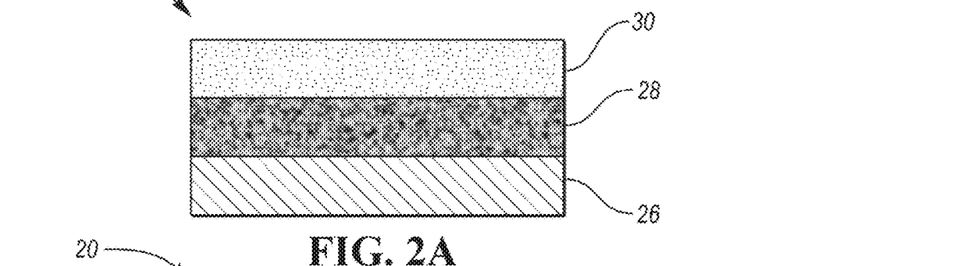
FIG. 2A shows a schematic depiction of an example catalyst including a carbon substrate layer, an amorphous metal oxide intermediate layer, and a surface metal layer.
Figure 2B:
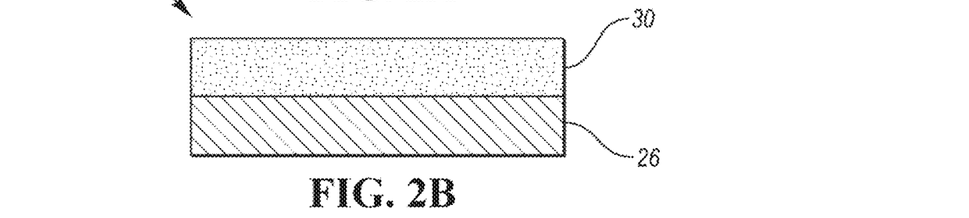
FIG. 2B shows an alternative schematic arrangement of another example catalyst having a carbon substrate layer and a surface metal layer.

The embodiments of the current disclosure overcome one or more above-named disadvantages. In one or more embodiments, a fuel cell ORR catalyst 20 is disclosed. The catalyst 20 includes a carbon substrate 26, an amorphous conductive metal oxide intermediate layer 28 attached to the substrate 26, and a surface metal layer 30 configured as an intertwined matrix comprising elemental platinum and elemental niobium, wherein upon oxidation, niobium acts as a reservoir of atomic oxygen and improves durability of the catalyst 20 by strengthening bonds between the platinum and the intermediate layer. An example of the catalyst 20 is shown in FIG. 2A. An alternative example catalyst, free of the amorphous conductive metal oxide intermediate layer, is depicted in FIG. 2B.

The substrate 26 may be any base material capable of providing support for the amorphous conductive metal oxide intermediate layer 28, the surface metal layer 30, or both and being suitable for a fuel cell. The substrate 26 may be a carbon structure. The substrate 26 may be a carbon fiber support. The substrate 26 may be a composite support such as graphite, carbon nanofibers, macromolecules, the like, or a combination thereof. The substrate 26 may include members of the fullerene structural family such as carbon nanotubes, nanospheres, nanoellipsoids, nanorods, the like, or a combination thereof. The substrate 26 may include a honeycomb lattice structure or a three-dimensional graphene material having periodic and non-periodic honeycomb-like portions. The substrate 26 may include graphene flakes. The substrate 26 may include a network of carbon fibers. The substrate 26 may be a carbon fiber paper, a carbon fiber cloth, a carbon nanotube sheet, a carbon nanotube yarn, a carbon nanotube tape, or the like, having a pore size of about 50 nm to 10 µm, 5 nm to 500 nm, or 1 nm to 200 nm. The substrate material may have a diameter of 50 nm to 1 µm, 10 nm to 500 nm, or 0.7 nm to 200 nm. The surface area of the substrate 26 may be from about 200 $m^2$/g to 5,000 $m^2$/g. The substrate 26 should be lightweight, strong, and porous enough to allow gas and water vapor to pass through to the catalyst layer 20. The substrate 26 may be a powder.

The intermediate layer 28 may be an amorphous conductive metal oxide intermediate layer 28. The intermediate layer 28 may be attached to and/or cover the substrate 26. The intermediate layer 28 may be included to improve geometry of the catalyst 20, prevent disintegration of the catalyst structure, as well as assist in ensuring that the surface metal layer nanoparticles do not form aggregations or that a formation of the aggregations is minimized prior to utilization of the fuel cell. The intermediate layer 28 may further improve catalytic activity of the cathode 16.

The metal oxide of the intermediate layer 28 may be distributed on top of the carbon substrate 26 to enhance formation of the intertwined matrix. The intermediate layer 28 may form a layer between the substrate 26 and the intertwined matrix of the surface metal layer 30. The intermediate layer 28 may be arranged in the same plane as the intertwined matrix. The intertwined matrix may be attached to the metal oxide of the intermediate layer 28, the atoms of the substrate 26, or both. Alternatively, the metal oxide may function as a barrier between the carbon substrate 26 and the metal nanoparticle matrix. Alternatively still, the metal oxide may be deposited between at least some monolayers of the intertwined matrix. The metal oxide may be deposited onto the substrate 26 prior to deposition of the metal particles or be co-deposited with the metal particles of the surface metal layer 30.

The intermediate layer 28 may include metal oxide such as niobium oxide, tantalum oxide, molybdenum oxide, or a combination thereof. A combination of the metal oxides with an additional metal such as cobalt, manganese, nickel, rhodium, ruthenium, gold, titanium, tungsten, iridium, the like, or their combination is also contemplated. The amount of the metal oxide within the intermediate layer 28 may be from about 0.05 mg/$cm^2$ to 3 mg/$cm^2$, 0.5 mg/$cm^2$ to 2 mg/$cm^2$, or 0.2 mg/$cm^2$ to 1 mg/$cm^2$ of the substrate.

The intermediate layer 28 may be continuous or discontinuous. The metal oxide is amorphous and may form a variety of structures. Amorphous character refers to the intermediate layer 28 having no definite form, no repeating lattice, no repeating pattern of atoms, no crystalline structure. As such, the metal oxide amorphous layer 28 is conductive in contrast to non-conductive crystalline structures. If the intermediate layer 28 is crystalline, the metal layer 28 has to be in direct contact with the substrate 26 to ensure conductivity.

The intermediate layer 28 may have an undulating, uneven, and/or wavy surface and a non-uniform shape. The uneven surface refers to a surface which is not level, flat, or smooth, does not follow a regular pattern, and is not the same in all of its portions. The uneven surface may include one or more formations. The formations may have an elongated, curved arrangement. Each formation may have different dimensions, shape, configuration, and/or orientation than other formations. The formations may form individual island-like structures or blobs within the intermediate layer 28.

Additionally, the amorphous NbOx of the intermediate layer 28 has a surface energy of about half that of platinum, but one order of magnitude higher than that of carbon. Therefore, presence of the amorphous NbOx facilitates the formation of the intertwined network, which, together with d-band interaction between NbOx and platinum, may greatly improve the ORR activity.

The surface metal layer 30 may include a combination of platinum and niobium as electrocatalyst particles to provide the ORR catalytic function. Both metals are deposited in its elemental form. The platinum loading may be about 3 to 50 wt. %, 5 to 40 wt. %, 8 to 30 wt. %, or 10 to 20 wt. %. Advantageously, even at a low platinum loading of up to 10 wt. %, the catalyst has improved activity and durability in comparison to typical catalysts, which is further illustrated in the discussion below. The platinum to niobium ratio may be from 7:1 to 1:7, 5:1 to 1:5, or 0.5:1 to 3:1. An example Pt:Nb ratio may be 7:3.

The platinum and niobium may form a layered network or intertwined matrix. The surface metal layer 30 may thus include one or more layers of platinum and one or more layers of niobium. The amount of platinum and/or niobium layers may be 1 to 20 or more, 5 to 15, or 8 to 10. The layers may be monolayers. The thickness of each layer may be 1 atom thick or thicker. The layers and/or the matrix may have even or uneven thickness. For example, due to the undulating character of the intermediate layer, the thickness of the niobium and/or platinum layers may differ within each layer. The platinum and/or niobium layers and/or the matrix may have an undulating character, following the shape of the intermediate layer.

The arrangement of layers may have a variety of configurations. For example, the platinum and niobium layers may alternate. Alternatively, one or more layers of platinum may be arranged closer to the intermediate layer or the substrate and be covered with one or more layers of elemental niobium. The layers may be discreet. Alternatively, the layers may overlap such that the metal particles from one layer submerge into one or more metal layers below and/or extend to one or more layers above. Alternatively still, the intertwined matrix may contain both platinum and niobium in one or more layers.

Platinum loading of each layer may be the same or different as in the remaining layers. For example, layers closer to the GDL may have a higher or lower Pt loading than the remaining layers. Each layer may have a different or same ratio of platinum to niobium. For example, the very top layer may have a higher content of niobium than the remaining layers. The ratio may gradually decrease or increase in one direction such as from the substrate layer 26 or the intermediate layer 28 towards the GDL.

Figure 3:
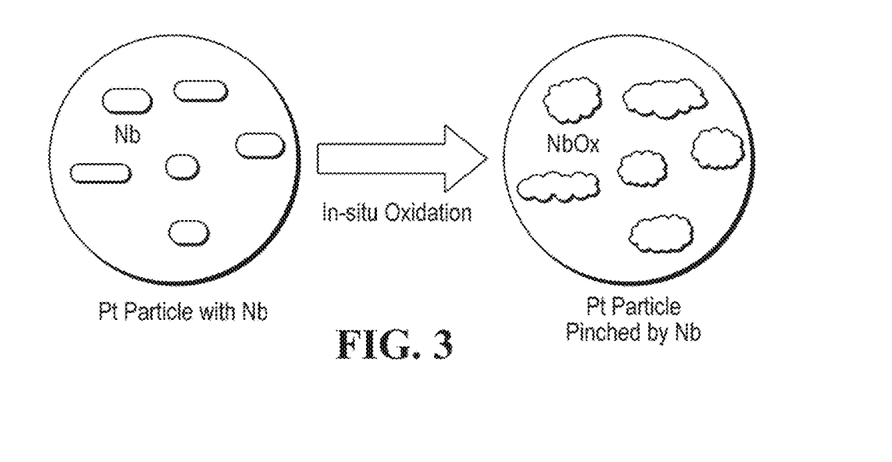
FIG. 3 shows a schematic in-situ oxidation of Nb to NbOx.

It has been unexpectedly discovered that including the elemental niobium in the surface metal layer 30 strengthens bonds between the platinum and the intermediate layer 28 or the substrate 26, if the intermediate layer 28 is absent. Without limiting the disclosure to a single theory, it is presumed that strong affinity between Pt and amorphous NbOx, formed from elemental Nb during oxidation processes in a working fuel cell, helps to pin down Pt during fuel cell vehicle operation, improving the fuel cell operation durability. Elemental Nb is underoxidized when applied to the surface metal layer 30. The elemental Nb is thus capable of taking more oxygen while the fuel cell is being used, and thus becomes a reservoir of oxygen. Niobium has three oxidation states: NbO, $NbO_2$ and $Nb_2O_5$. Amorphous $NbO_x$ (x=2~2.5) not only has a high stability in VFCOE, but it has beneficial ORR activity and good electrical conductivity. Formation of the NbOx from the elemental Nb intertwined with Pt, as opposed to only utilizing NbOx pre-applied to the carbon substrate, has resulted in a more durable and active catalyst, as the data in Table 1 below illustrate. For example, the end of life (EOL) mass activity of the catalyst after 25,000 cycles may be about 250 to 500 $A/g_{Pt}$, 300 to 450 $A/g_{Pt}$, or 350 to 400 $A/g_{Pt}$ at a Pt loading of about 0.5 to 30 wt. %, 5 to 20 wt. %, or 8 to 12 wt. %. And the mass activity retention of the catalyst may be about 70 to 120%, 80 to 110%, or 90 to 105% after 25,000 cycles. A schematic depiction of a Pt particle with co-sputtered Nb being oxidized in-situ to NbOx is depicted in FIG. 3. After cycling, Nb changes to NbOx which has d-band interaction with the platinum particle to increase the ORR activity, and the close contact between NbOx and platinum enhances the pinning of platinum, improving durability of the catalyst.

Utilizing oxidation processes of the fuel cell to form NbOx from elemental Nb in combination with the intertwined network of platinum-elemental niobium has provided the following advantages. As the ORR catalyst is being used, elemental Nb is slowly transformed into NbOx either in amorphous or crystalline state. This increases the ORR activity and extends useable life of the catalyst due to the fact that the formed NbOx further interacts with and pins down the platinum to enhance the catalyst activity and durability. Additionally, such arrangement results in a closer arrangement between platinum and niobium which increases the d-band interaction and thus the ORR activity in the beginning of the fuel cell service.

EXAMPLES AND COMPARATIVE EXAMPLE

Figure 4:
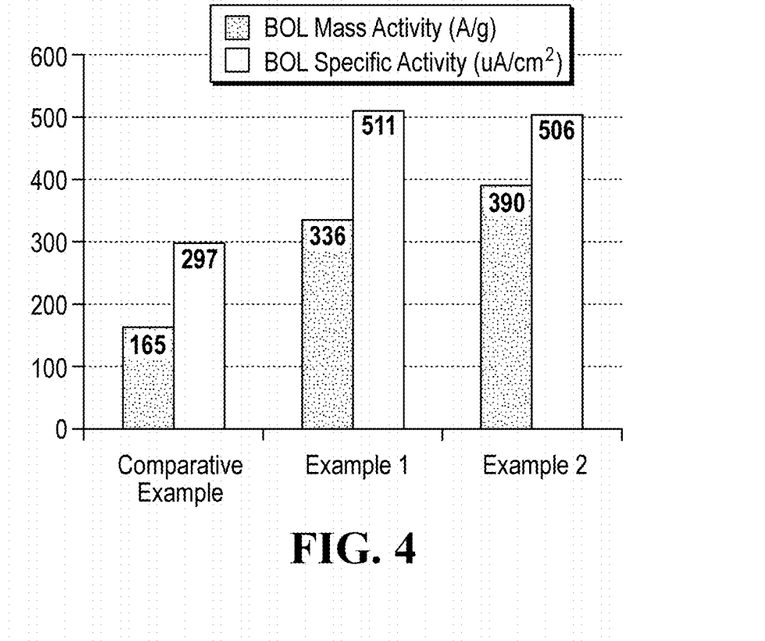
FIG. 4 shows a plot depicting Beginning of Life (BOL) Mass Activity test results for a prior art catalyst, Comparative Example, a catalyst including co-sputtered Pt and Nb on a carbon substrate, Example 1, and a catalyst including co-sputtered Pt and Nb on amorphous NbOx on a carbon substrate, Example 2, according to one or more embodiments.
Figure 5:
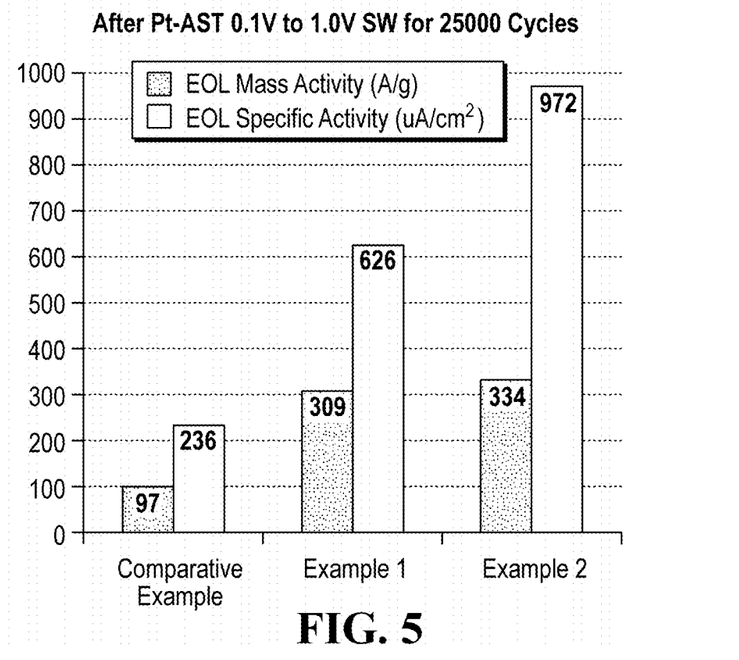
FIG. 5 shows a plot depicting End of Life (EOL) Mass Activity test results for a prior art catalyst, Comparative Example, a catalyst including co-sputtered Pt and Nb on a carbon substrate, Example 1, and a catalyst including co-sputtered Pt and Nb on amorphous NbOx on a carbon substrate, Example 2.
Figure 6:
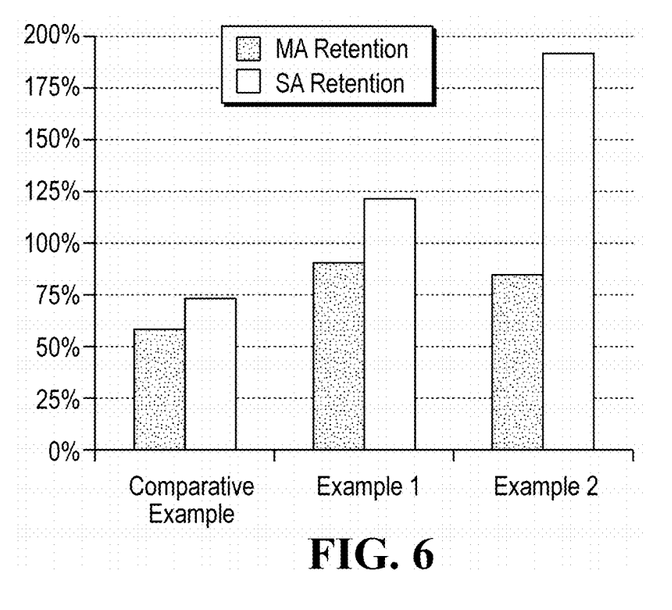
FIG. 6 shows a plot depicting Mass Activity and Specific Activity Retention test results for a prior art catalyst, Comparative Example, a catalyst including co-sputtered Pt and Nb on a carbon substrate, Example 1, and a catalyst including co-sputtered Pt and Nb on amorphous NbOx on a carbon substrate, Example 2.

Table 1 below and FIGS. 4-6 provide a comparison of the ORR catalytic activities of a prior art catalyst, TKK EA-50 catalyst prepared by a typical wet-chemical process, Comparative Example, with a catalyst prepared by sputtering of Pt and Nb onto a carbon substrate, Example 1, and a catalyst prepared by sputtering of Pt and Nb onto an amorphous NbOx on a carbon substrate, Example 2. The mass activity and specific activity were measured at the beginning of life (BOL) and at the end of life (EOL) after 25,000 cycles. The mass activity and specific activity retention data, or mass activity and specific activity delta Δ data, referring to the difference between the BOL and EOL values for the respective activity, were gained after a 25K Pt-stress test relating to 25,000 cycles of a Pt-stress test relating to a cycle run on a rotating disk electrode (RDE) from 0.1 to 1 V square wave 3 s each with 6 s/cycle.

TABLE 1

Mass Activity and Specific Activity comparison data between Examples 1, 2, and Comparative Example

| Example No. | Pt loading | Mass Activity BOL [$A/g_{Pt}$] | Specific Activity BOL [$A/cm^2$] | Mass Activity EOL [$A/g_{Pt}$] | Specific Activity EOL [$A/cm^2$] | Mass Activity Δ [%] | Specific Activity Δ [%] |
|---|---|---|---|---|---|---|---|
| Comparative Example | 46.7 | 165.4 | 297.0 | 97.0 | 236.0 | 59.0 | 74.3 |
| Example 1 | 10.0 | 336.3 | 511.3 | 309.1 | 625.7 | 91.2 | 122.6 |
| Example 2 | 10.2 | 390.3 | 506.2 | 334.3 | 972.3 | 85.6 | 192.1 |

Figure 7:
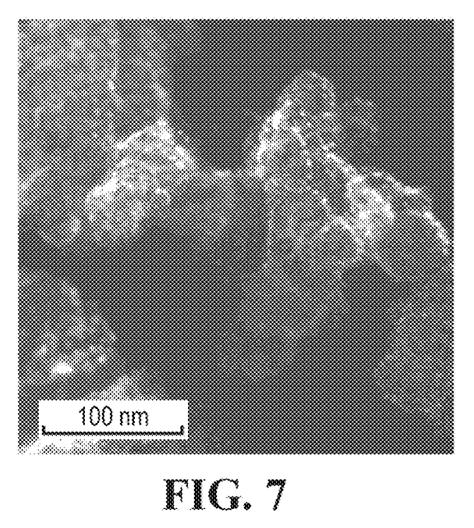
FIGS. 7 and 8 represent dark-field scanning transmission electron microscope (STEM) photographs of a catalyst including co-sputtered Pt and Nb on amorphous NbOx on a carbon substrate.
Figure 8:
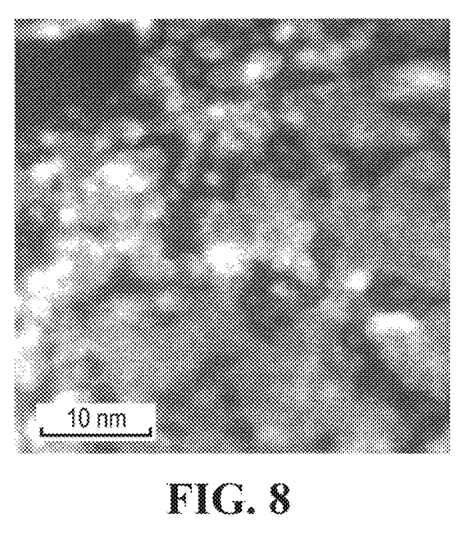
Figure 9:
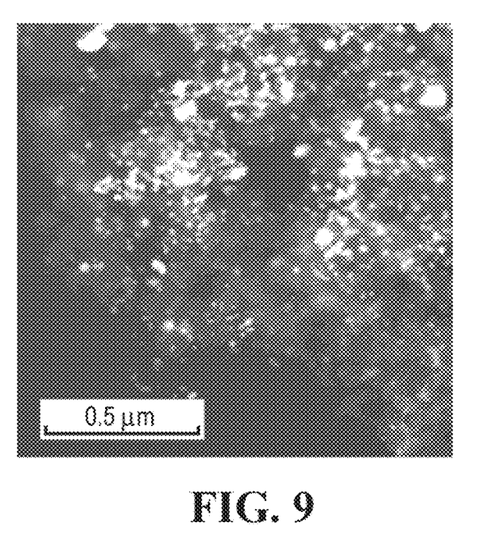
FIG. 9 is a dark-field STEM photograph of the catalyst including co-sputtered Pt and Nb on amorphous NbOx on a carbon substrate after a 25K Pt-stress test.

FIGS. 7-9 are images of Example 2. The images represent dark-field STEM photographs, where the black color represents the carbon substrate, the gray color depicts the NbOx of the intermediate layer, and the bright white color represents the platinum and/or elemental niobium in the surface metal layer. FIGS. 7 and 8 depict the catalyst at the time of Pt and Nb deposition on the amorphous NbOx. FIG. 9 captures the catalyst after the 25K Pt-stress test discussed above.

Typically, a solution-based or wet-chemical method is used to deliver a fuel cell electrocatalyst powder onto a substrate. The powder is then processed into an ink which is coated onto a GDL which is used to help remove water on the cathode side while delivering the hydrogen to the anode side and oxygen to the cathode side. The solution-based method, however, may result in an uneven distribution of the metal particles onto the substrate. Additionally, the electrocatalyst delivered by the wet-chemical method typically forms agglomerations. The agglomerations are responsible for the high electrocatalyst loading as at least some of the individual atoms within the agglomerations are not being utilized. Additionally still, wet-chemical methods utilize chemistry such as chloroplatonic acid which may be incompatible with efforts to provide environmentally conscious fuel cell solutions.

While the wet-chemical method may be used to deposit elemental platinum and/or niobium onto the carbon substrate or the metal oxide layer, a physical vapor deposition (PVD) provides easier processing and lower platinum loading, and thus lower cost of the produced catalyst. PVD is a general term describing a number of vacuum deposition methods used to produce thin films. PVD involves condensation and evaporation of material and an atom-by-atom transfer of the material from the solid phase to the vapor phase and back to the solid phase. PVD produces a vapor of the solid material by heating or sputtering. The vaporized material is then transferred from the source to a substrate by line-of-sight, molecular flow, or vapor ionization by creating plasma. The vaporous phase is then deposited onto the substrate. The process may be repeated to form a number of layers of the deposited material. PVD is carried out at temperatures of about 0° C. to 1000° C. Example PVD methods include cathodic arc deposition, electron beam PVD, sputter deposition including pulse DC sputtering, DC sputtering, radiofrequency sputtering, and ion-specific sputtering, evaporative deposition, and pulsed laser deposition. During the traditional PVD methods, metal particles are delivered onto a substrate under a right angle.

The metal oxide of the intermediate layer may be deposited by PVD onto the carbon substrate. Likewise, the elemental platinum and niobium may be applied by PVD. Deposition of the metal oxide, platinum, niobium, or their combination may be conducted as co-sputtering or alternatively as a deposition of individual layers. Platinum and niobium may be deposited consequentially.

The intertwined matrix containing platinum and niobium may be deposited as was described above. The carbon substrate coated with the metal oxide and/or the electrocatalyst may be heat-cured after the particle deposition is finished. Optionally, the catalyst-loaded substrate may be impregnated with an ionomer solution such as sulfonated tetrafluoroethylene-based fluoropolymer-copolymer at the same time or prior to stacking of the coated substrate as layers to assemble a fuel cell stack 10. The ionomer solution may be applied by dipping, spraying, printing, brushing, spin coating, or in any other suitable manner, onto the catalyst coated substrate. A PEM 18 may be provided adjacent to the coated substrate. The PEM 18 may be a perfluorsulfonic membrane. The PEM 18 may be about 2 µm to 100 µm thick. The end or bipolar plates 24 may be added. In this manner, a portion of a fuel cell 10 including a plate 24, an anode 12, a membrane 18, a cathode 16, and a plate 24 adjacent to each other may be assembled. The method may include a step of assembling a number of fuel cell units 10 into stacks to provide a fuel cell assembly. A fuel cell may contain about 3 to 400 fuel cell units 10.

The method may further include utilizing oxidation/reduction processes of the fuel cell and transforming at least a portion of the elemental niobium to NbOx by oxidation while the fuel cell is being used. As the elemental niobium is being reduced, it changes its oxidation state and acts as a reservoir of atomic oxygen. The oxidation process renders the niobium more stable, the niobium interacts with platinum and helps to passivate at least a portion of the catalyst, which in turn increases the catalyst durability and activity.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A fuel cell oxidation reduction reaction catalyst comprising:
   a carbon substrate;
   an amorphous niobium oxide intermediate layer on the substrate; and
   an intertwined matrix of platinum and elemental niobium arranged to form a surface metal layer covering the intermediate layer such that upon oxidation, the niobium binds with oxygen resulting in strengthened bonds between the platinum and the intermediate layer.

2. The catalyst of claim 1, wherein the intermediate layer further comprises, tantalum oxide, molybdenum oxide, or a combination thereof.

3. The catalyst of claim 1, wherein platinum loading associated with the surface metal layer is about 3 wt. % to 50 wt. %.

4. The catalyst of claim 1, wherein platinum to elemental niobium ratio in the surface metal layer is from 7:1 to 1:7.

5. The catalyst of claim 1, wherein the intertwined matrix comprises at least one layer of platinum and at least one layer of elemental niobium.

6. The catalyst of claim 1, wherein the intertwined matrix comprises a plurality of platinum layers alternating with a plurality of elemental niobium layers.

7. The catalyst of claim 1, wherein an end of life mass activity of the catalyst after 25,000 cycles is about 250 $A/g_{Pt}$ to 500 $A/g_{Pt}$ at a Pt loading of about 5 wt. % to 25 wt. %.

8. The catalyst of claim 1, wherein mass activity retention of the catalyst is about 75% to 100% after 25,000 cycles.

9. The catalyst of claim 1, wherein the carbon substrate comprises carbon nanofibers.

10. The catalyst of claim 1, wherein the carbon substrate comprises carbon fiber cloth.

11. The catalyst of claim 1, wherein the carbon substrate comprises a network of carbon fibers.

12. The catalyst of claim 1, wherein the intermediate layer is arranged in the same plane as the intertwined matrix.

13. A method of forming a fuel cell oxidation reduction reaction electrocatalyst of claim 1, the method comprising:
   depositing the amorphous niobium oxide on the carbon substrate to form the intermediate layer;
   sputtering elemental platinum and elemental niobium onto the intermediate layer to form the surface metal layer configured as the intertwined matrix; and
   transforming at least a portion of the elemental niobium to NbOx by oxidation resulting in the strengthened bonds between the platinum and the intermediate layer.

14. The method of claim 13, further comprising sputtering elemental platinum and elemental niobium consequentially to form discreet layers of each.

15. The method of claim 13, further comprising sputtering the elemental platinum and the elemental niobium in a ratio of from 7:1 to 1:7.

16. The catalyst of claim 1, wherein the intermediate layer further comprises, tantalum oxide, molybdenum oxide, or a combination thereof.

17. The method of claim 13, further comprising achieving mass activity retention of the electrocatalyst of about 80% to 100% after 25,000 cycles.

18. The method of claim 13, wherein the conductive metal oxide forms an amorphous layer free of a regularly repeating atomic lattice.

\* \* \* \* \*